United States Patent [19]

Nishio

[11] Patent Number: 5,055,855
[45] Date of Patent: Oct. 8, 1991

[54] PIXEL INTERVAL COMPENSATING METHOD

[75] Inventor: Tomonori Nishio, Kanagawa, Japan

[73] Assignee: Fuji Photo Film Co., Ltd., Kanagawa, Japan

[21] Appl. No.: 508,674

[22] Filed: Apr. 13, 1990

[30] Foreign Application Priority Data

Apr. 17, 1989 [JP] Japan .................................. 1-96631

[51] Int. Cl.⁵ .......................... H04N 1/21; G01D 9/42
[52] U.S. Cl. ................................ 346/1.1; 346/107 R; 358/298
[58] Field of Search .................. 346/108, 107 R, 160, 346/1.1; 250/204; 358/408, 296, 298, 300, 302

[56] References Cited

U.S. PATENT DOCUMENTS

| 4,524,372 | 6/1985 | DeCock et al. | 346/107 R |
| 4,525,729 | 6/1985 | Agulnek et al. | 346/107 R |

*Primary Examiner*—Mark J. Reinhart
*Attorney, Agent, or Firm*—Sughrue, Mion, Zinn Macpeak & Seas

[57] ABSTRACT

A method of compensating the interval of a plurality of pixels to be simultaneously recorded on a recording surface. The plurality of pixels are recorded by a plurality of beams whose light intensity distributions partially overlap with one another on the recording surface and the pixel whose position should be compensated is selected. The light quantity ratio of the plurality of beams for recording the pixel is changed. Since the light quantity is changed, the peak of the density of pixel is shifted on the side of the beam of a large light quantity so that the interval between the pixels can be compensated.

19 Claims, 11 Drawing Sheets

SUB-SCANNING DIRECTIONAL DISTANCE

F I G. 3
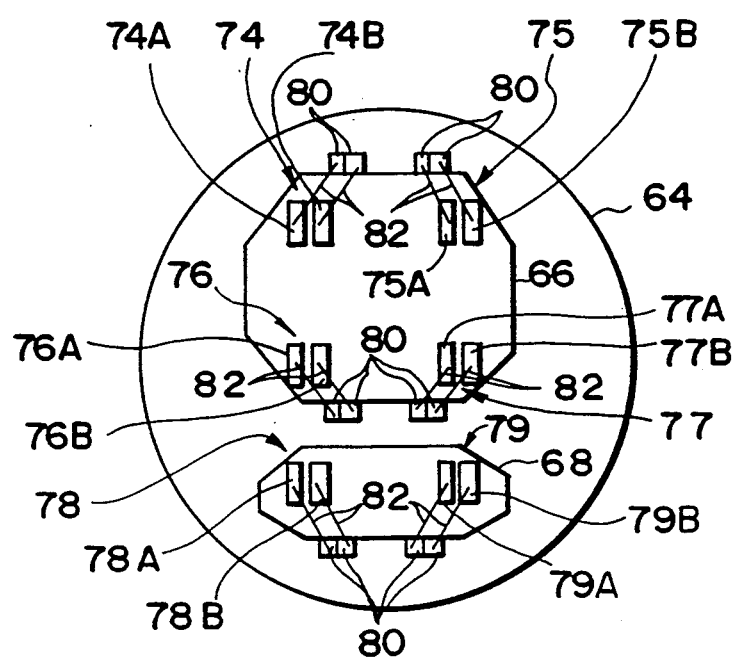

SUB-SCANNING DIRECTIONAL DISTANCE

FIG.11
(A)
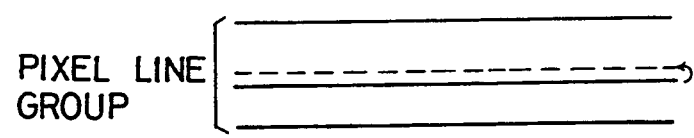
PIXEL LINE GROUP
(B)
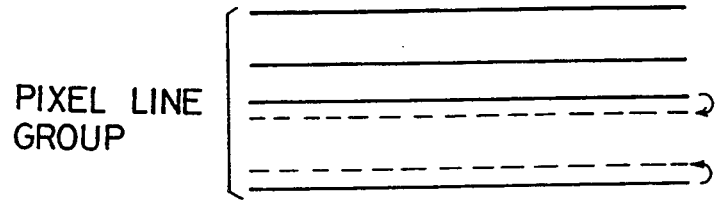
PIXEL LINE GROUP

PIXEL INTERVAL COMPENSATING METHOD

BACKGROUND OF THE INVENTION

1. Field of the Invention

The present invention relates to a method of compensating the interval between pixels of an image recording apparatus, and, more particularly, to a method of compensating the interval of pixel lines of an image recording apparatus having a plurality of pixel lines extending in the main scanning direction and arranged in parallel in the sub-scanning direction and recording an image by performing an exposure in such a manner that the plurality of pixel lines are simultaneously recorded.

2. Description of the Related Art

Hitherto, there has been an image recording apparatus for recording, by its exposure head, an image on a recording material by rotating the recording material with wound around a recording drum thereof. An exposure head for use in the image recording apparatus of the type described above is arranged in such a manner that light emitting bodies such as LEDs are disposed on a stem. Optical beams emitted from the light emitting bodies are converged through a lens so as to be applied to the recording material. In an apparatus in which two light emitting bodies are disposed in the sub-scanning direction at a predetermined pitch, two pixels parallel to each other are exposed simultaneously in such a manner that two pixel lines are simultaneously recorded in parallel in the sub-scanning direction. Therefore, an advantage can be obtained in that the time taken to complete the recording of an image can be halved in comparison to a case in which the pixel lines are, one by one, recorded whenever the recording drum is rotated.

However, in the case where two pixels are simultaneously recorded at a predetermined pitch in the sub-scanning direction, the quality of image is deteriorated if the light emitting bodies in the sub-scanning direction are not disposed at a predetermined pitch, if the peak of the intensity of each of beams from the light emitting bodies deviates from the center line of the light emitting body and if the converging lens is distorted. The reason for the image quality deterioration lies in that since the pixels recorded on the recording material deviate from a predetermined pitch, the pixel lines recorded by scanning deviate from a predetermined pitch and the density of the recorded image is thereby periodically changed in the sub-scanning direction. That is, in the case where the interval between peak $P_1$ of density A, in the sub-scanning direction, of the first pixel line recorded by a first light emitting body and peak $P_2$ of density B, in the sub-scanning direction, of the second pixel line recorded by a second light emitting body becomes smaller than a predetermined pitch, as shown in FIG. 8, density $D_{AB}$ between the peak $P_1$ of the density A and the peak $P_2$ of the density B is raised and density $D_{BA}$ between the peak $P_2$ of the density B and the peak $P_1$ of the density A is lowered. Therefore, density C of the recorded image changes and deteriorates every two pixel lines in the sub-scanning direction.

In order to obtain a high quality image by eliminating the above-described periodical change of the density C of the recorded image, the accuracy in mounting the light emitting bodies must be raised, the peak of the intensity of each of the light emitting bodies must be made coincide with the center line of each of the light emitting bodies, and the distortion of the converging lens must be eliminated. However, the improvement of the mounting accuracy of the light emitting bodies arises a problem in that the manufacturing yield of the apparatus deteriorates. The measure taken to make the peak of the intensity of the optical beam from each of the light emitting bodies coincide with the center line of each of the light emitting bodies arises a problem in that the manufacturing cost of the light emitting body is raised. Furthermore, the measure to eliminate the distortion of the converging lens arises a problem in that the manufacturing cost of the converging lens is raised.

The present invention has been established for the purpose of overcoming the above-described problems. An object of the present invention is to provide an pixel interval compensating method for the purpose of obtaining a high quality image without the periodical density change in the sub-scanning direction without deteriorating the manufacturing yield of the apparatus and without raising the manufacturing cost of each of the light emitting body and the converging lens.

SUMMARY OF THE INVENTION

In order to achieve the above-described object, according to the present invention, there is provided a pixel interval compensating method for compensating the intervals of a plurality of pixels which are simultaneously recorded on a recording surface, the pixel interval compensating method including the steps of: emitting a plurality of beams of which light intensity distributions partially overlap with one another so as to record said plurality of pixels; and making said intervals between adjacent two of said pixels to be recorded to become a predetermined value by changing the light quantity ratio of the plurality of beams.

In the above arrangement a plurality of beams of which light intensity distributions partially overlap with one another are emitted in such a manner that a plurality of pixel are recorded. Therefore, the peak position of the light density distribution of the plurality of beams of which light intensity distributions partially overlap with one another can be shifted by changing the light quantity ratio of the plurality of the beams. The interval of the pixels can be compensated to be a predetermined value by changing the peak position, as described above.

In the case where two pixel are simultaneously recorded, since the interval of the pixel can be compensated by arranging the structure in such a manner that at least one pixel can be shifted, at least one pixel may be recorded by a plurality of beams. Another structure may be employed in which both the two pixel are recorded by a plurality of beams and the positions of the two pixel are compensated so as to compensate the interval.

Also in the case where three pixels are recorded, the intervals among all of the pixels can be made the same by arranging the structure in such a manner that at least one pixel can be shifted. Therefore, the structure may be arranged in such a manner that at least one pixel is recorded by a plurality of beams. In this case, two or three pixel may be recorded by the plurality of beams. In the case where four pixels are simultaneously recorded, the intervals of all of the pixels can be made the same by arranging the structure in such a manner that at least two pixels can be shifted. Therefore, the structure may be arranged in such a manner that at least two pixels are recorded by the plurality of beams. Therefore, in the case where N (where symbol N represents an integer which is three or more) pixels are simultaneously recorded, the structure may be arranged in such a manner that at least N−2 pixels are recorded by a plurality of beams and at least N−2 pixels are shifted. Since the interval of pixel groups consisting of the above-described plurality of pixels can also be changed by changing at least one of the scanning speed and the scanning distance, a structure may be employed which is arranged in such a manner that the interval between the pixels is compensated as described above and the interval between the pixel groups is compensated by changing at least one of the scanning speed and the scanning distance. Also the interval between the pixel line groups can, of course, be changed by changing the above-described light quantity ratio.

As a result of the above-described compensation, the interval between the pixels recorded by simultaneous scanning and the interval between the pixel groups recorded thereby are, as shown in FIG. 9, made to be predetermined value X.

Since the quantity of light can be expressed by the product of the light intensity and the light application time, the light quantity ratio of a plurality of beams can be changed by changing at least either the light intensity ratio of a plurality of beams or the light application time thereof.

The interval among the pixels may be measured by actual recording and it may be determined by measuring the light intensity distributions of the plurality of beams. Thus, in the present invention, since a plurality of beams are emitted so as to record each of a predetermined number of pixels and each of intervals among the pixels is made to be a predetermined pitch by changing the light quantity of the plurality of beams, each of the intervals can be compensated in such a manner that a high quality image having no periodical density change along a sub-scanning direction without deteriorating the productivity of the apparatus and raising the manufacturing cost of the light emitting bodies and the converging lens.

Other and further objects, features and advantages of the invention will be appear more fully from the following description.

BRIEF DESCRIPTION OF THE DRAWINGS

FIG. 3 is a schematic front view which illustrates the arrangement of LED chips according to the embodiment of the present invention;

FIGS. 11A and 11B which respectively illustrate the method for compensating the interval between pixel lines according to the embodiment of the present invention in the case where three pixel lines are used and the case where four pixel lines are used.

DESCRIPTION OF THE PREFERRED EMBODIMENT

A preferred embodiment of the present invention will now be described.

Figure 7:
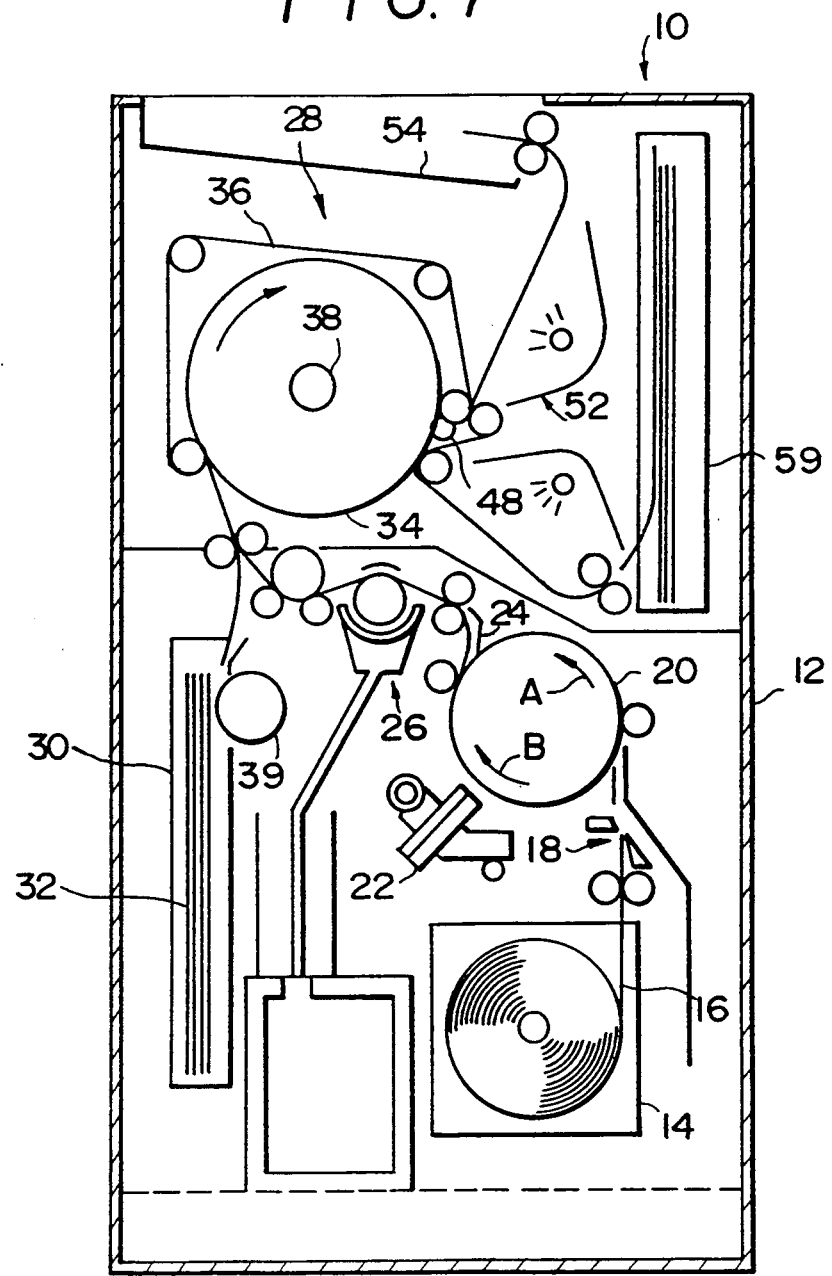
FIG. 7 is a schematic structural view which illustrates the schematic structure of an image recording apparatus to which a method for compensating the interval between pixel lines according to the embodiment of the present invention can be applied.
Figure 8:
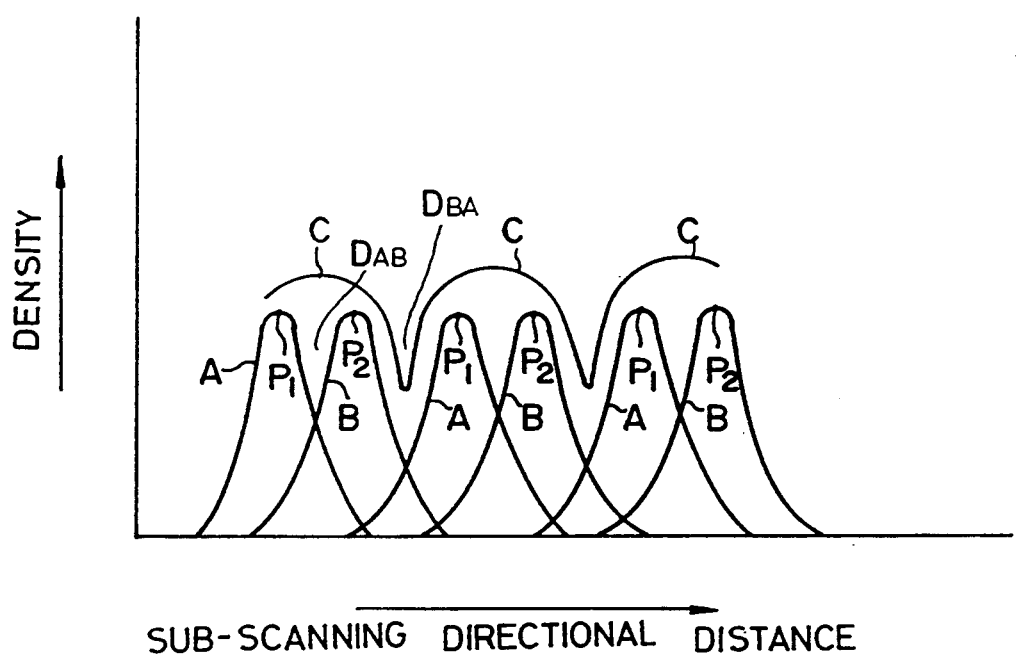
FIG. 8 is a graph which illustrates the relationship between the image density and the length in the sub-scanning direction according to a conventional example.
Figure 9:
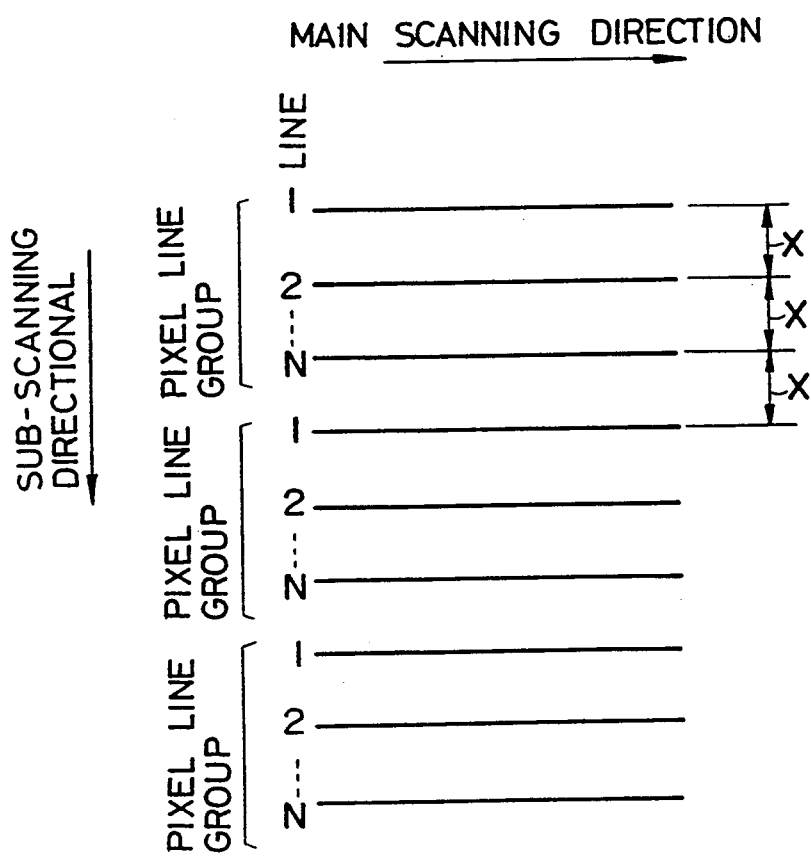
FIG. 9 illustrates a state of the recording of the image lines of the exposure head to which the method for compensating the interval between pixel lines according to the embodiment of the present invention has been applied.

FIG. 7 illustrates an image recording apparatus 10 to which a method for compensating the interval between pixels according to the present invention can be applied.

The image recording apparatus 10 has a magazine 14 accommodated in a frame 12, the magazine 14 accommodating a photosensitive material 16 coiled up in the form of a roll. The photosensitive material 16 is drawn out from the outer portion thereof, and is cut by a cutter 18 so as to be a predetermined length. The thus cut photosensitive material 16 is wound around a rotational drum 20 which is being rotated in a direction designated by an arrow A. An exposure head 22 is disposed so as to confront the outer surface of the rotational drum 20. The exposure head 22 is arranged to be moved along the axis (in the sub-scanning direction) of the rotational drum 20 at the time of the high speed rotation of the rotational drum 20 so that an image is exposed to the wound photosensitive material 16.

The photosensitive material 16 is separated from the rotational drum 20 by a scraper 24 due to the reverse (in a direction designated by an arrow B) rotation of the rotational drum 20 after the exposure. The photosensitive material 16 is then supplied with water which serves as an image-forming solvent in a water application portion 26. Then, it is moved toward a thermal developing and transcribing portion 28 including a heating portion.

On the other hand, a tray 30 disposed below the thermal developing and transcribing portion 28 accommodates a plurality of image receiving materials 32 cut into a predetermined length. The image receiving materials 32 are successively and one by one taken out by a supply roller 39 disposed at the side portion of the tray 30. Each of image receiving materials 32 thus taken out is arranged to be moved to the thermal developing and transcribing portion 28 in such a manner that it overlaps with the photosensitive material 16 which has passed through the water application portion 26.

The thermal developing and transcribing portion 28 is provided with a heating drum 34 and a pressing endless belt 36, the heating drum 34 including therein a halogen lamp 38 which serves as the above-described heating portion. The photosensitive material 16 and the image receiving material 32 are moved so as to be thermally developed and transcribed with held between the heating drum 34 and the pressing endless belt 36 for substantially two-third circumference of the heating drum 34. The heating drum 34 is heated up to about 90° C. by the halogen lamp 38.

Peeling device 48 is disposed on the exit portion of the thermal developing and transcribing portion 28, the peeling device 48 sending the photosensitive material 16 and the image receiving material 32 sent from the thermal developing and transcribing portion 28 with separating the photosensitive material 16 and the image receiving material 32 from one another. The photosensitive material 16 thus separated is sent to an exhaust photosensitive material accommodating box 59, while the image receiving material 32 is sent to a taking tray 54 formed on the top end portion of the frame 12 after the image receiving material 32 has been dried up.

Figure 1:
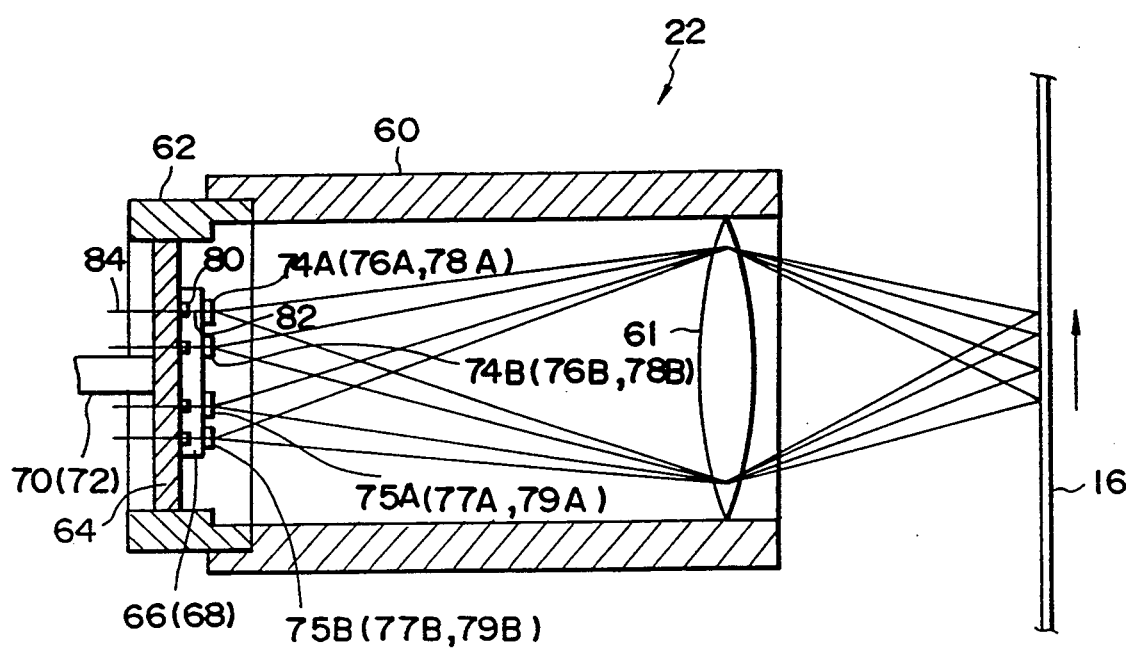
FIG. 1 is a schematic cross sectional view taken along the sub-scanning direction of an exposure head according to an embodiment of the present invention.
Figure 2:
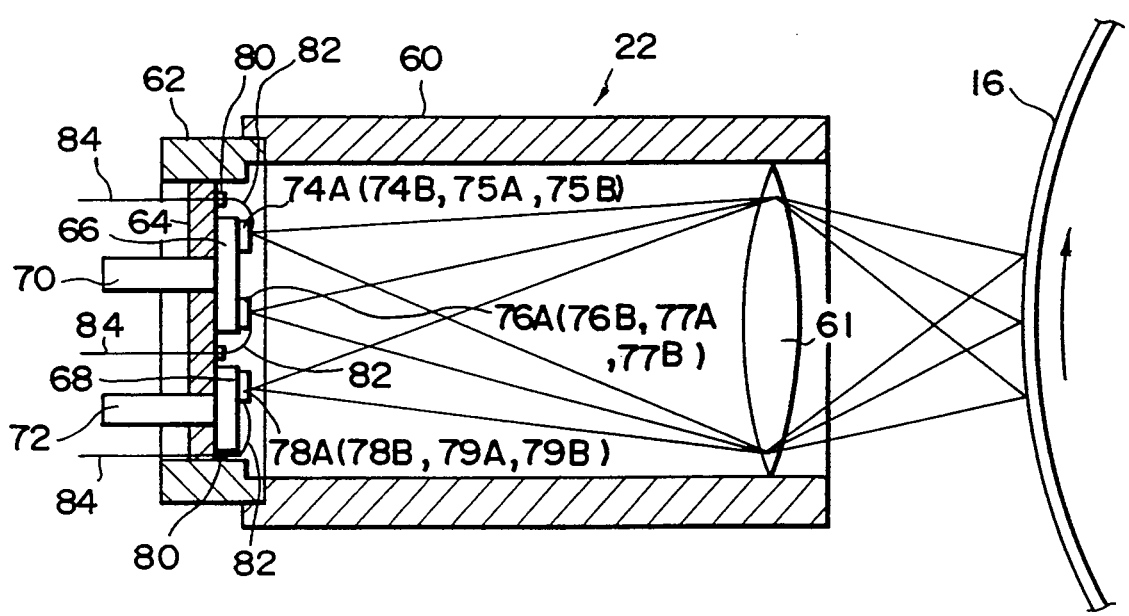
FIG. 2 is a schematic cross sectional view taken along the main scanning direction of the exposure head according to the embodiment of the present invention.

As shown in FIGS. 1 and 2, the exposure head 22 comprises a lens barrel 60, the lens barrel 60 having a converging lens 61 at an end portion thereof and having a stem 62 at another end portion thereof. The stem 62 is arranged in such a manner that the inner surface thereof has been subjected to an antireflection treatment and an insulating substrate 64 is secured thereto. The substrate 64 has conductive bases 66 and 68 secured to the inner surface thereof (the surface adjacent to the lens barrel 60). Radiating bases 70 and 72, also serving as electrodes which outward project through the substrate 64, are connected to the corresponding bases 66 and 68.

As shown in FIG. 3, the base 66 has light emitting portions 74, 75, 76 and 77 disposed at predetermined intervals and to form two columns. The other base 68 has light emitting portions 78 and 79 disposed at a predetermined interval so that two pixel lines are simultaneously recorded. The light emitting portions 74, 75, 76, 77, 78 and 79 are constituted by corresponding LED chip pairs respectively formed by two LED chips 74A and 74B, 75A and 75B, 76A and 76B, 77A and 77B, 78A and 78B, and 79A and 79B. An electrode 80 is fastened to each of the portions adjacent to the LED chips, each of the LED chips being bonded by means of wires 82. As shown in FIG. 1, a wire penetrating the substrate 64 is connected to each of the electrodes 80 so that an electric current is allowed to flow to each of the LED chips via the wires 84.

Each of the LED chips is arranged to emit beams of different wavelengths. That is, the LED chips 74A, 74B, 75A and 75B emit infrared rays causing the photosensitive material 16 to form cyanogen (C) pigment. The LED chips 76A, 76B, 77A and 77B emit red beams causing the photosensitive material 16 to form magenta (M) pigment. The LED chips 78A, 78B, 79A and 79B emit yellow beams causing the photosensitive material 16 to form yellow (Y) pigment.

Figure 4:
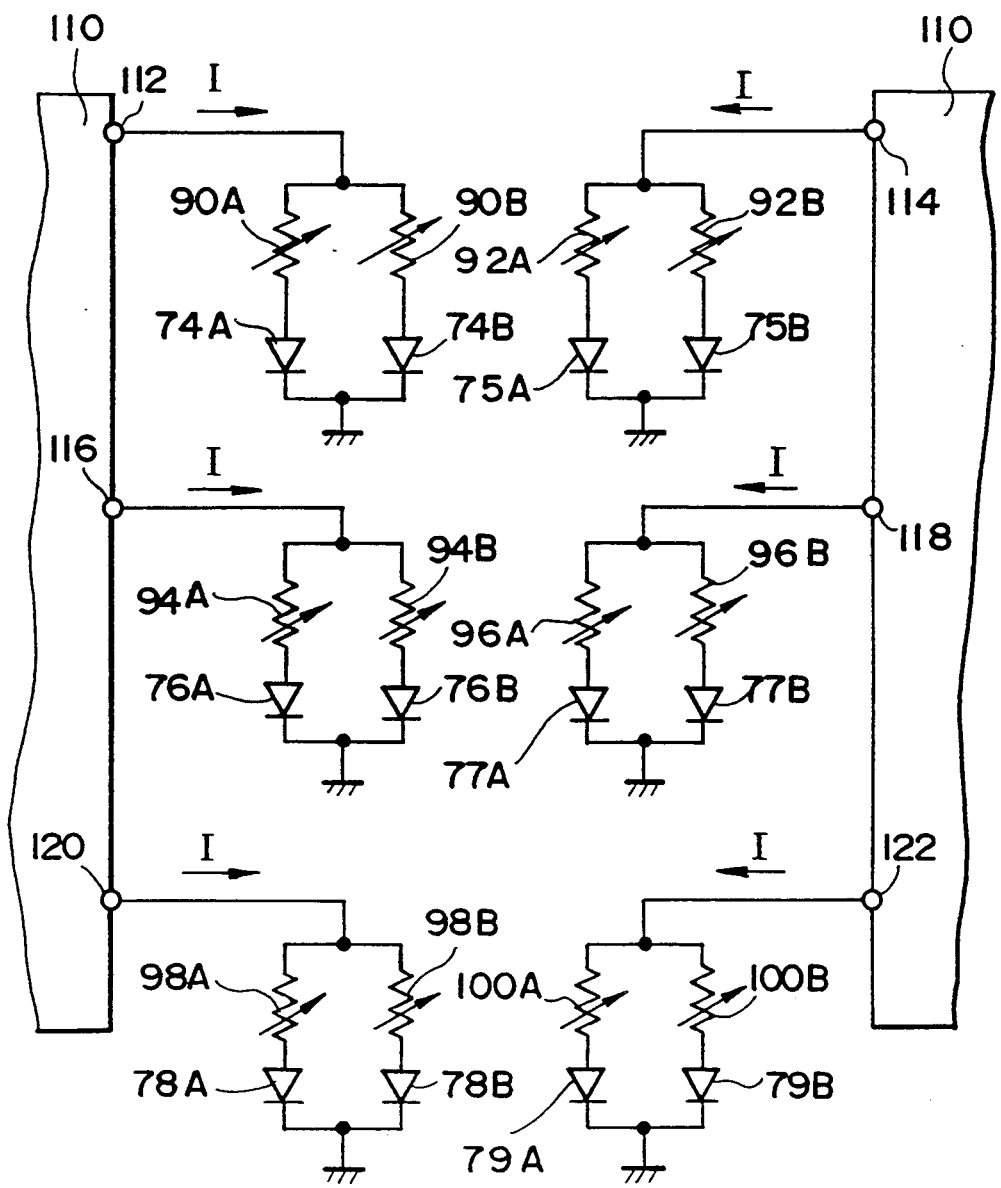
FIG. 4 illustrates a circuit for use in the exposure head according to the embodiment of the present invention.

As shown in FIG. 4, variable resistors 90A, 90B, 92A, 92B, 94A, 94B, 96A, 96B, 98A, 98B, 100A and 100B are respectively connected in series to the corresponding LED chips 74A, 74B, 75A, 75B, 76A, 76B, 77A, 77B, 78A, 78B, 79A and 79B. Therefore, the level of the electric current to be supplied to each of the LED chips can be controlled by changing the resistance of each of the above-described variable resistors. The LED chip 74A and the variable resistor 90A connected to each other in series and the LED chip 74B and the variable resistor 90B connected to each other in series are, in parallel, connected to an output terminal 112 of current control device 110 comprising a microcomputer. Similarly, the LED chip 75A and the variable resistor 92A connected to each other in series and the LED chip 75B and the variable resistor 92B connected to each other in series are connected to an output terminal 114 of the current control device 110 in parallel. The LED chip 76A and the variable resistor 94A connected to each other in series and the LED chip 76B and the variable resistor 94B connected to each other in series are connected to an output terminal 116 of the current control device 110 in parallel. The LED chip 77A and the variable resistor 96A connected to each other in series and the LED chip 77B and the variable resistor 96B connected to each other in series are connected to an output terminal 118 of the current control device 110 in parallel. The LED chip 78A and the variable resistor 98A connected to each other in series and the LED chip 78B and the variable resistor 98B connected to each other in series are connected to an output terminal 120 of the current control device 110 in parallel. The LED chip 79A and the variable resistor 100A connected to each other in series and the LED chip 79B and the variable resistor 100B connected to each other in series are connected to an output terminal 122 of the current control device 110 in parallel.

Then, a method of compensating the interval between the pixel lines of the image recording apparatus according to the present invention will be described.

First, the compensation of the intervals between the cyanogen (C) monocolor pixels will be described. The resistance of the variable resistor 90A and that of 90B are adjusted so as to become the same level and a predetermined current I is caused to flow from the output terminal 112 of the current control device 110. The rotational drum 20 is rotated at a predetermined rotational speed and the exposure head 22 is moved so that the first pixel line is recorded on the image receiving material 32. Simultaneously, the resistance of the variable resistor 92A and that of 92B are adjusted so as to become the same level and a predetermined current I is caused to flow from the output terminal 114 of the current control device 110. The rotational drum 20 is rotated and the exposure head 22 is moved so that the second pixel line is recorded on to the image receiving material 32. The thus recorded image is then thermally developed and transcribed and, thereafter, the way of change in the density of the image is observed.

Figure 5:
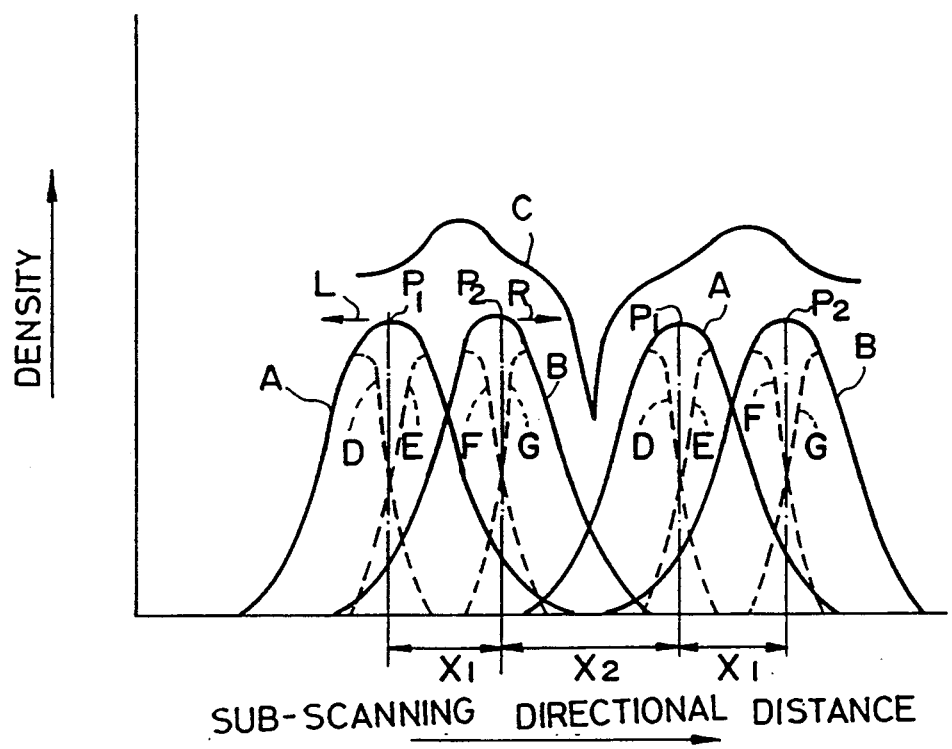
FIG. 5 is a graph which illustrates the relationship between the image density and the length in the sub-scanning direction according to the embodiment of the present invention.
Figure 6:
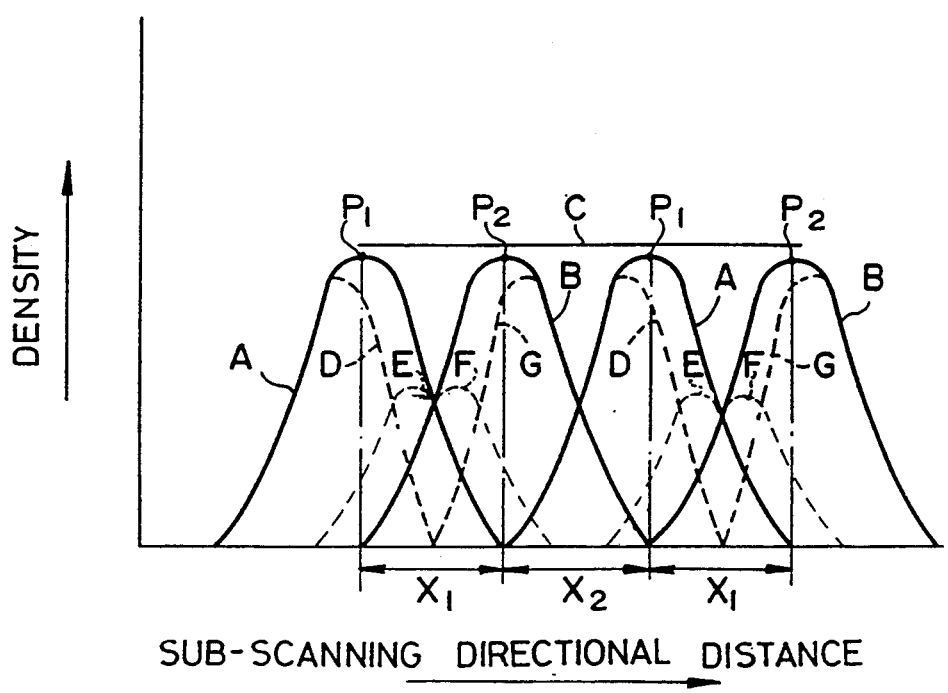
FIG. 6 is a graph which illustrates the relationship between the image density and the length in the sub-scanning direction in the case where the quantity of light of the LED chip has been changed.

It is assumed here that the density of the image recorded on the image receiving material 32 is periodically changed in the sub-scanning direction, as shown in FIG. 5. The above-described periodical density change can, as shown in FIG. 5 be compensated by moving the peak $P_1$ of density A of the first pixel line in a direction designated by an arrow L and by moving the peak $P_2$ of density B of the second pixel line in a direction designated by an arrow R. When the peak $P_1$ of the density A of the first pixel line is moved toward the LED chip 74A (in the direction designated by the arrow L), the current to be supplied to the LED chip 74A is enlarged by adjusting the variable resistance 90A and the current to be supplied to the LED chip 74B is reduced by adjusting the variable resistance 90B. As a result, the intensity of light emitted from the LED chip 74A is raised, while the intensity of light emitted from the LED chip 74B is lowered. Therefore, as shown in FIG. 6, density E realized by the infrared rays of the LED chip 74B is lowered in comparison to density D realized by the infrared rays of the LED chip 74A. As a result, the peak of density A which is the sum of the density D and the density E is shifted toward the density D. When the peak P₂ of the density B of the second pixel line is moved toward the LED chip 75B (in the direction designated by the arrow R), the current to be supplied to the LED chip 75A is reduced by adjusting the variable resistance 92A and the current to be supplied to the LED chip 75B is enlarged by adjusting the variable resistance 92B. As a result, the intensity of light emitted from the LED chip 75A is lowered, while the intensity of light emitted from the LED chip 75B is raised. Therefore, as shown in FIG. 6, density G realized by the infrared rays of the LED chip 75B is raised in comparison to density F realized by the infrared rays of the LED chip 75A. As a result, the peak of density B which is the sum of the density F and the density G is shifted toward the density G.

The above-described adjustment operation is repeated until the periodical change of the image density C of the image receiving material 32 in the sub-scanning direction is, as shown in FIG. 6, eliminated. In this case, the pitches between the pixel lines become the same in such a manner that the interval $X_1$ between the peak $P_1$ of the density A of the first pixel line in the sub-scanning direction and the peak $P_2$ of the density B of the second pixel line in the sub-scanning direction and the interval $X_2$ between the peak $P_2$ of the density B of the second pixel line in the sub-scanning direction and the peak $P_1$ of the density A of the first pixel line in the sub-scanning direction become the same. Then, the levels of the variable resistors 90A, 90B, 92A and 92B are fixed.

In cases of magenta (M) and yellow (Y), the interval between pixel lines is compensated by the manner similar to the above description.

It is to be noted that the interval $X_1 + X_2$ in the sub-scanning direction in equal to the distance that the beam is moved in the sub-scanning direction after two pixel lines have been recorded until next two pixel lines are recorded.

As described above, according to this embodiment, each of the two pixel lines is recorded by two beams and the intensity ratio between the two beams is changed so that the two pixel lines are made to be disposed at a predetermined pitch. Therefore, an excellent effect can be obtained in that the interval of the pixel lines of a recording apparatus can be compensated and high quality images can thereby be formed without periodical density changes in the sub-scanning direction with exhibiting high efficiency for manufacturing the apparatus and low cost for manufacturing the light emitting body and the converging lens.

Although the intensity of light is changed in the embodiment according to the present invention, a structure may be employed in which a current is independently supplied to each of LED chips and time in which the current is supplied, that is, the light application time ratio is changed so that the peaks of the pixel lines are changed. Another structure may be employed in which both the intensity of light and the light application time are changed and the peaks of the pixel lines are thereby changed.

Although the two pixel lines are recorded by two beams according to this embodiment, a structure may be employed in which only one pixel line is recorded by two beams and the two pixel lines are disposed at a predetermined pitch by changing the intensity ratio of the two beams. Although each of the light emitting portions 74, 75, 76, 77, 78 and 79 is constituted by two LEDs, it may be constituted by three or more LED chips and the light intensity ratio among the LED chips is changed so as to adjust the pitch between pixel lines. Although the description is made about the compensating method for use in the case where the two pixel lines are simultaneously recorded in the sub-scanning direction, the intervals between the pixel lines can be compensated when three or more pixel lines are simultaneously recorded.

For example, as shown in FIG. 11A, image nonuniformity can, of course, be prevented by recording only one central pixel line by a plurality of beams so as to cause this pixel line to position at the center position (the position designated by a short-dashes line in FIG. 11A) in the case where three pixel lines are simultaneously written.

In the case where the number of the pixel lines is four, the pitch can be made the same by fixing the two pixel lines and shifting the residual two pixel lines to the positions designated by short-dash lines as shown in FIG. 11B. In the case where three or more pixel lines are simultaneously recorded, it is necessary to arrange the structure in such a manner that at least $N-2$ (where symbol N represents an integer holding the relationship: $N \geq 3$) can be compensated.

Figure 10:
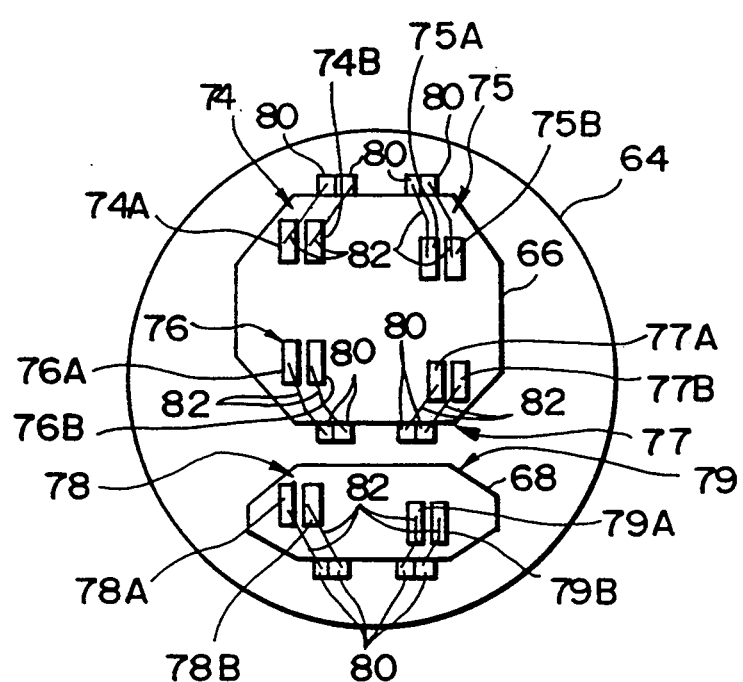
FIG. 10 is a schematic front view which illustrates the arrangement of LED chips according to another embodiment of the present invention.

Although the description is made about a case in which the two light emitting portions corresponding to each of colors are disposed in the sub-scanning direction, the intervals of the pixel lines can also be compensated in a case where the light emitting portions are deviated from the sub-scanning direction as shown in FIG. 10.

An example where the intervals between the pixel lines are compensated by recording the pixel lines actually has been described above as the embodiment, but the present invention is arranged such that the light intensity distributions of the beams for recording are measured and on the basis of the measured result the intervals may be compensated. Although the above description is directed to the pixel line constituted by many pixels, the present invention is also applied to compensation for interval between the pixels. In the above embodiment the light quantity ratio is changed such that the beam positioned on the side toward which the pixel line is shifted becomes increased, but in this invention it may be changed such that the beam positioned on the reverse side is decreased. Further, the present invention is applied to both negative photosensitive material and positive photosensitive material.

Although the invention has been described in its preferred form with a certain degree of particularly, it is understood that the present disclosure of the preferred from has been changed in the details of construction and the combination and arrangement of parts may be resorted to without departing from the spirit and the scope of the invention as hereinafter claimed.

What is claimed is:

1. A pixel interval compensating method for compensating the intervals of a plurality of pixels which are simultaneously recorded on a recording surface, said pixel interval compensating method comprising the steps of:
    emitting a plurality of beams of which light intensity distributions partially overlap with one another so as to record said plurality of pixels; and
    making said intervals between adjacent two of said pixels to be recorded to be predetermined value by changing the light quantity ratio of said plurality of beams.

2. A pixel interval compensating method according to claim 1, wherein at least one of the light intensity ratio of said plurality of beams and the light application time is changed so that said light quantity ratio is changed.

3. A pixel interval compensating method according to claim 1, wherein at least one pixel is recorded by said plurality of beams in the case where two pixels are simultaneously recorded on said recording surface.

4. A pixel interval compensating method according to claim 1, wherein at least N−2 pixels are recorded by said plurality of beams in the case where N (where symbol N represents an integer which is three or more) pixels are simultaneously recorded on said recording surface.

5. A pixel interval compensating method according to claim 1 further comprising: determining at least one of scanning speed and a scanning distance in such a manner that the distance between adjacent two of pixel groups consisting of said plurality of pixels to be recorded by simultaneous scanning becomes said predetermined value.

6. A pixel interval compensating method according to claim 1, wherein said light quantity ratio of said plurality of beams is changed in such a manner that said interval of said pixels and the distance between adjacent two of pixel groups consisting of said plurality of pixels to be recorded by simultaneous scanning become said predetermined value.

7. A pixel interval compensating method according to claim 1, wherein at least one of a scanning speed and a scanning distance is determined in such a manner that the distance between adjacent two of pixel groups consisting of said plurality of pixels to be recorded by simultaneous scanning becomes said predetermined value after said light quantity ratio of said plurality of beams has been changed in such a manner that said interval of said pixels becomes said predetermined value.

8. A pixel interval compensating method according to claim 1, wherein said light quantity ratio of said plurality of beams is changed in such a manner that said interval of said pixels becomes said predetermined value after at least one of a scanning speed and a scanning distance has been determined in such a manner that said interval of pixel groups consisting of said plurality of pixels to be recorded by simultaneous scanning becomes said predetermined value.

9. A pixel interval compensating method according to claim 1, wherein a step for emitting said plurality of beams and a step for changing said light quantity ratio are repeated until said interval between said pixels becomes said predetermined value.

10. A pixel interval compensating method according to claim 1, wherein said plurality of beams are arranged in a sub-scanning direction.

11. A pixel interval compensating method for compensating the intervals of a plurality of pixels which are simultaneously recorded on a recording surface, said pixel interval compensating method comprising the steps of:
   recording said plurality of pixels by means of scanning and by use of a plurality of beams arranged in such a manner that the light intensity distributions of said plurality of beams partially overlap with one another;
   selecting, in accordance with the result of said recording, at least one pixel of which peak position of a light intensity distribution should be shifted; and
   shifting said peak position by conducting at least one of the steps of changing the light quantity ratio of said plurality of beams in such a manner that the light quantity of beam positioned on the side toward which said peak position should be shifted among said plurality of beams becomes enlarged and of changing the light quantity ratio of said plurality of beams in such a manner the light quantity of beam positioned on the side reverse to the side toward which said peak position should be shifted among said plurality of beams becomes reduced so that said interval of said pixels is made a predetermined value.

12. A pixel interval compensating method according to claim 11, wherein said shifting step is conducted by at least one of the steps of changing at least one of the light intensity ratio and the light application time ratio of the said plurality of beams in such a manner that at least one of the light intensity and the light application time of said beam positioned on the side toward which the peak position should be shifted among said plurality of beams is enlarged and of changing at least one of the light intensity ratio and the light application of said plurality of beams in such a manner at least one of the light intensity and the light application time of said beams positioned on the side reverse to the side toward which said peak position should be shifted among said plurality of beams is reduced.

13. A pixel interval compensating method according to claim 11, wherein at least one pixel is recorded by said plurality of beams in the case where two pixels are simultaneously recorded on said recording surface.

14. A pixel interval compensating method according to claim 11, wherein at least N−2 pixels are recorded by said plurality of beams in the case where N (where symbol N represents an integer which is 3 or more) pixels are simultaneously recorded on said recording surface.

15. A pixel interval compensating method according to claim 11 further comprising: determining at least one of a scanning speed and a scanning distance in such a manner that the distance between adjacent two of pixel groups consisting of said plurality of pixels to be recorded by simultaneous scanning becomes said predetermined value.

16. A pixel interval compensating method according to claim 11, wherein said light quantity ratio of said plurality of beams is changed in such a manner that said interval of said pixels and the distance between adjacent two of pixel groups consisting of said plurality of pixels to be recorded by simultaneous scanning become said predetermined value.

17. A pixel interval compensating method according to claim 14, wherein at least one of a scanning speed and a scanning distance is determined in such a manner that the distance between adjacent two of pixel groups consisting of said plurality of pixels to be recorded by simultaneous scanning becomes said predetermined value after said light quantity ratio of said plurality of beams has been changed in such a manner that said interval of said pixels becomes said predetermined value.

18. A pixel interval compensating method according to claim 15, wherein said light quantity ratio of said plurality of beams is changed in such a manner that said interval of said pixels becomes said predetermined value after at least one of a scanning speed and a scanning distance has been determined in such a manner that said interval of pixel groups consisting of said plurality of pixels to be recorded by simultaneous scanning becomes said predetermined value.

19. A pixel interval compensating method according to claim 11, wherein said recording step, said selection step and a step in which the light quantity ratio is changed are repeated until said interval of said pixels becomes said predetermined value.

* * * * *